(12) United States Patent
Ducharme et al.

(10) Patent No.: US 9,238,525 B2
(45) Date of Patent: Jan. 19, 2016

(54) DRAIN ASSEMBLY FOR A TANK OR CONTAINMENT VESSEL

(71) Applicant: Rhinokore Composites Manufacturing Partnership, Calgary (CA)

(72) Inventors: Blake Ducharme, Houston, TX (US); Lawrence Hruschak, Houston, TX (US)

(73) Assignee: RHINOKORE COMPOSITES MANUFACTURING PARTNERSHIP, Calgary, Alberta (CA)

( * ) Notice: Subject to any disclaimer, the term of this patent is extended or adjusted under 35 U.S.C. 154(b) by 190 days.

(21) Appl. No.: 14/011,385

(22) Filed: Aug. 27, 2013

(65) Prior Publication Data

US 2015/0059891 A1 Mar. 5, 2015

(51) Int. Cl.
| | |
|---|---|
| *B65D 25/16* | (2006.01) |
| *B65D 25/14* | (2006.01) |
| *F17C 13/00* | (2006.01) |
| *F16L 21/08* | (2006.01) |
| *F16L 5/02* | (2006.01) |
| *F16L 21/00* | (2006.01) |
| *F16L 21/06* | (2006.01) |
| *B65D 88/54* | (2006.01) |
| *B65D 90/54* | (2006.01) |
| *B65D 90/20* | (2006.01) |

(52) U.S. Cl.
CPC .................. *B65D 25/16* (2013.01); *B65D 25/14* (2013.01); *B65D 88/54* (2013.01); *B65D 90/205* (2013.01); *B65D 90/54* (2013.01); *F16L 21/005* (2013.01); *F16L 21/06* (2013.01); *F17C 2203/0604* (2013.01); *F17C 2203/0619* (2013.01); *Y10T 137/698* (2015.04); *Y10T 137/6977* (2015.04); *Y10T 137/86308* (2015.04); *Y10T 137/86348* (2015.04)

(58) Field of Classification Search
CPC ................ F17C 2203/0604; F17C 2203/0619; B65D 25/16; B65D 25/14; F16L 21/005; F16L 21/06; Y10T 137/86348; Y10T 137/6977; Y10T 137/698
See application file for complete search history.

(56) References Cited

U.S. PATENT DOCUMENTS 1,618,720 A * 2/1927 Moore ............................ 222/91

(Continued)

*Primary Examiner* — Atif Chaudry
(74) *Attorney, Agent, or Firm* — Kinney & Lange, P.A.

(57) ABSTRACT

A drain assembly for a tank or containment vessel of the type having a flexible and removable interior liner. The drain assembly comprises a drain intake in fluid communication with a wall traversing portion. The drain intake is operatively deployable in proximity to the bottom of the tank and the wall traversing portion is operatively deployable through a wall of the tank. The wall traversing portion includes a conduit portion in fluid communication with the drain intake and with a location exterior to the tank. The conduit portion includes an interior stopper plate and a threaded portion. The drain assembly includes a hammer nut threadably receivable over the threaded portion when the conduit portion is received through the wall of the tank such that tightening the hammer nut upon the threaded portion causes the hammer nut to engage the exterior of the tank wall causing the stopper plate to compress the tank liner against the interior surface of the tank wall thereby securing the drain assembly to the tank wall and helping to prevent the unintentional leakage of the contents of the tank through the tank wall.

9 Claims, 3 Drawing Sheets

(56) References Cited

U.S. PATENT DOCUMENTS

| | | | |
|---|---|---|---|
| 2,651,050 A * | 9/1953 | Salzman | 4/416 |
| 2,793,830 A * | 5/1957 | Nakaji et al. | 251/147 |
| 2,896,657 A * | 7/1959 | Uhll et al. | 137/172 |
| 3,125,358 A * | 3/1964 | Kleinberg et al. | 285/55 |
| 5,971,444 A * | 10/1999 | Hawkins | 285/206 |
| 6,517,117 B1 * | 2/2003 | Lai | 285/202 |
| 7,533,850 B2 * | 5/2009 | Carns et al. | 244/135 R |
| 8,356,842 B2 * | 1/2013 | Carns et al. | 285/189 |
| 2012/0326431 A1 * | 12/2012 | Irwin et al. | 285/45 |

* cited by examiner

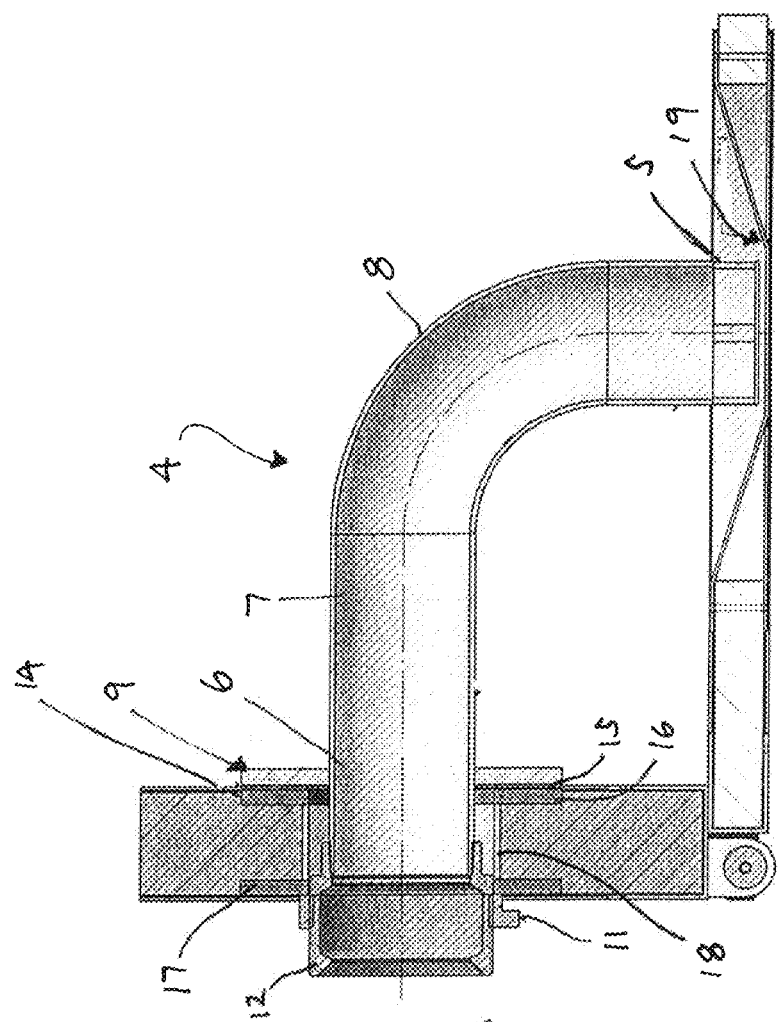
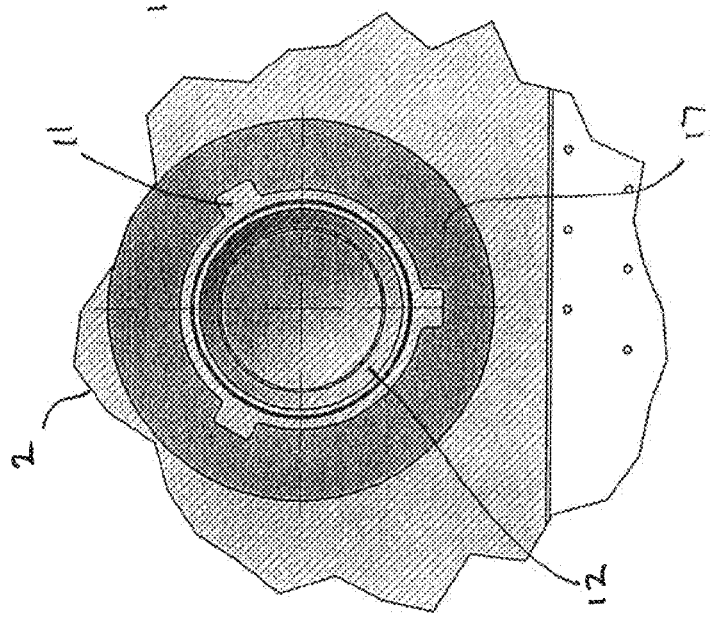
Fig 2
Fig 3

DRAIN ASSEMBLY FOR A TANK OR CONTAINMENT VESSEL

BACKGROUND

Portable, semi-permanent or permanent containment tanks, enclosures or vessels are commonly used in the oil and gas industry, in the mining and mineral processing industries, and for a wide variety of other industries and industrial applications. Such tanks or enclosures are often used to store liquids, slurries or other fluids until such time as they can be further processed or otherwise disposed of or collected and shipped to other locations. An example of a temporary containment vessel is one used in association with oil and gas drilling. When drilling an oil or gas well, drilling mud is typically pumped down the well in order to serve as the source of energy to turn the drill bit. Drilling mud typically contains toxic and/or expensive additives that cannot be released into the environment, or that for economic reasons need to be recovered. In such instances as the mud leaves the casing it is directed to a tank or containment vessel, after which it can be recycled back into the drilling circuit or gathered and shipped for processing, disposal or reuse. A further example of the use of such tanks in the oil and gas industry is to contain large volumes of fluids during fracking operations.

Since in many instances containment tanks or vessels are required on a temporary or semi-permanent basis, they are often formed in a manner that allows them to be transported to the desired location, assembled, used for the desired purpose, disassembled, and then shipped for subsequent use in a different location. To assist in quick assembly and disassembly, the tanks may be formed from a series of individual panels that create the tank's bottom and walls. After the panels have been erected, a liner is typically inserted in order to provide a fluid-tight containment.

In order to drain the contents of the tank, a suction line from a pump can be lowered over one of the tank walls. However, in cold weather applications where the top of the tank is covered in order to prevent freezing of the fluids, deployment of a suction line over a tank wall becomes somewhat more difficult. Further, the pumping equipment used to drain large tanks can be of considerable size and weight, making it sometimes necessary to utilize cranes or other lifting apparatuses in order to lower the suction line into the tank. For that reason, others have proposed installing a drain port within the side wall of the tank. Such ports require the use of a series of bolts, that extend through the tank wall and that secure the drain port within the wall to permit the tank to be drained when desired, while at the same time allowing the drain to be sealed to prevent unintentional leakage of the tank contents. Unfortunately, in the case of large tanks that are lined with a flexible liner, it has been found that the pumping of material into and out of the tank often causes small shifts in the liner. In such cases shifting of the liner puts considerable stress upon the liner material at the locations where the bolts that extend through the tank wall to maintain the drain in place pass through the liner material. The stress upon a liner can cause tearing and shifting of the liner, which in some instances can result in a leakage of the tank contents. Further, the assembly of the drain within the tank is laborious as it typically requires an individual both inside and outside the tank in order to assemble the bolts. Where the tank is to be disassembled, removal of the drain will often require an individual to enter the tank, which may present health hazards depending upon the materials that have been stored therein.

SUMMARY

The invention therefore provides a drain assembly for a tank or containment vessel of the type having a flexible and removable interior liner, the drain assembly comprising a drain intake in fluid communication with a wall traversing portion, said drain intake operatively deployable in proximity to the bottom of the tank and said wall traversing portion operatively deployable through a wall of the tank, said wall traversing portion including a conduit portion in fluid communication with said drain intake and with a location exterior to the tank, said conduit portion including an interior stopper plate and a threaded portion, said drain assembly including a hammer nut, said hammer nut threadably receivable over said threaded portion when said conduit portion is received through the wall of the tank wherein tightening said hammer nut upon said threaded portion causes said hammer nut to engage the exterior of the tank wall causing said stopper plate to compress the tank liner against the interior surface of the tank wall thereby securing said drain assembly to the tank wall and helping to prevent the unintentional leakage of the contents of the tank through the tank wall Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 2 is a side elevational view through a wall and the bottom of tank or containment vessel incorporating therein a drain assembly in accordance with an embodiment of the present invention.

FIG. 3 is a left hand side elevational view of the drain assembly shown in FIG. 2.

DETAILED DESCRIPTION

The present invention may be embodied in a number of different forms. The specification and drawings that follow describe and disclose some of the specific forms of the invention.

Figure 1:
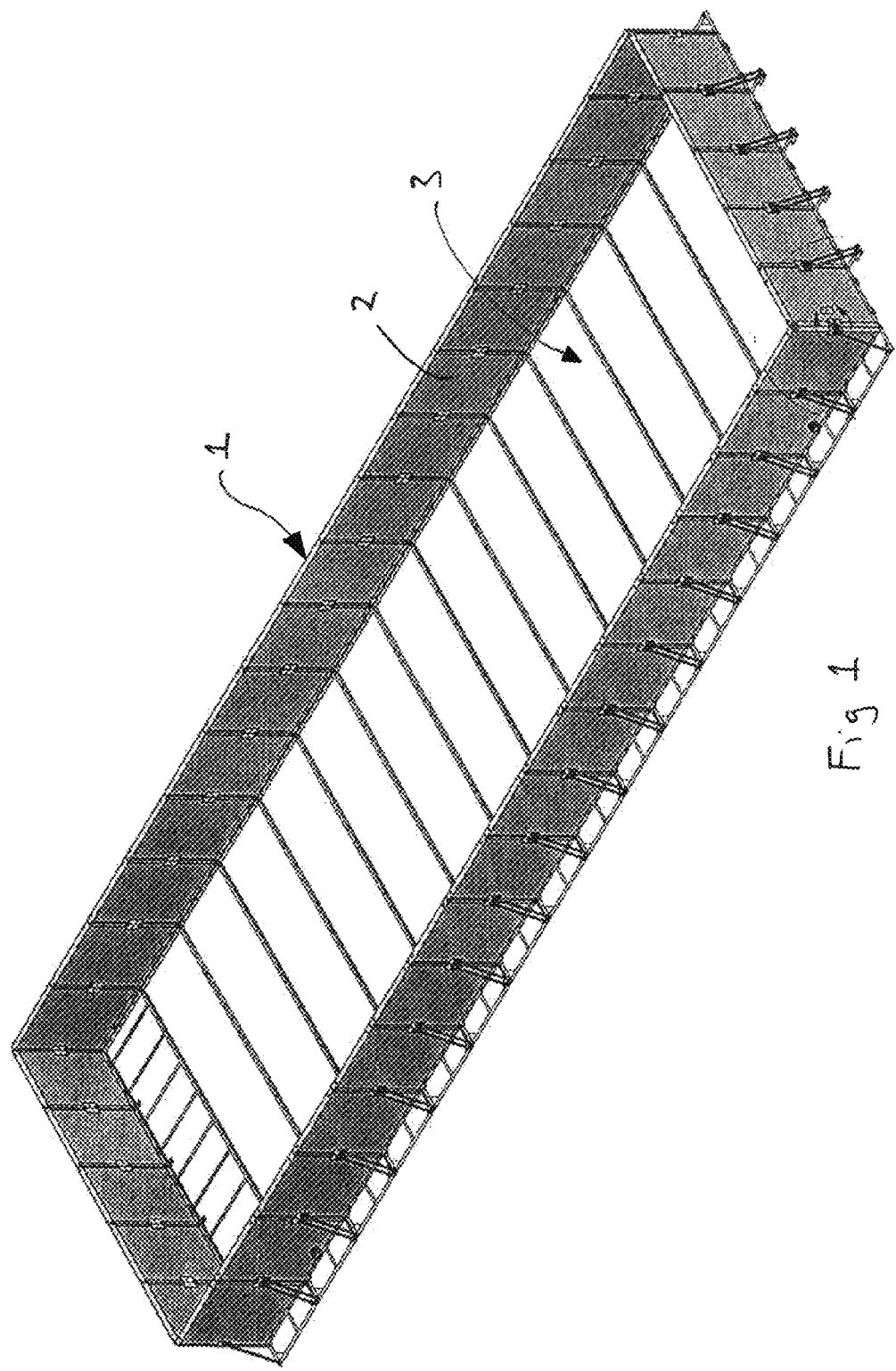
FIG. 1 is an upper side elevational view of an embodiment of a portable tank or containment vessel.

With reference to the attached Figures there is shown in FIG. 1 an embodiment of a portable tank or containment vessel 1 comprised generally of walls 2 and a floor 3. In the particular embodiment shown in FIG. 1 the flexible liner that would commonly be placed within the walls of the tank is not shown. Such tanks are often rectangular in shape, however, they may also take any one of a very wide variety of other geometric shapes depending upon available space and intended use.

Figure 4:
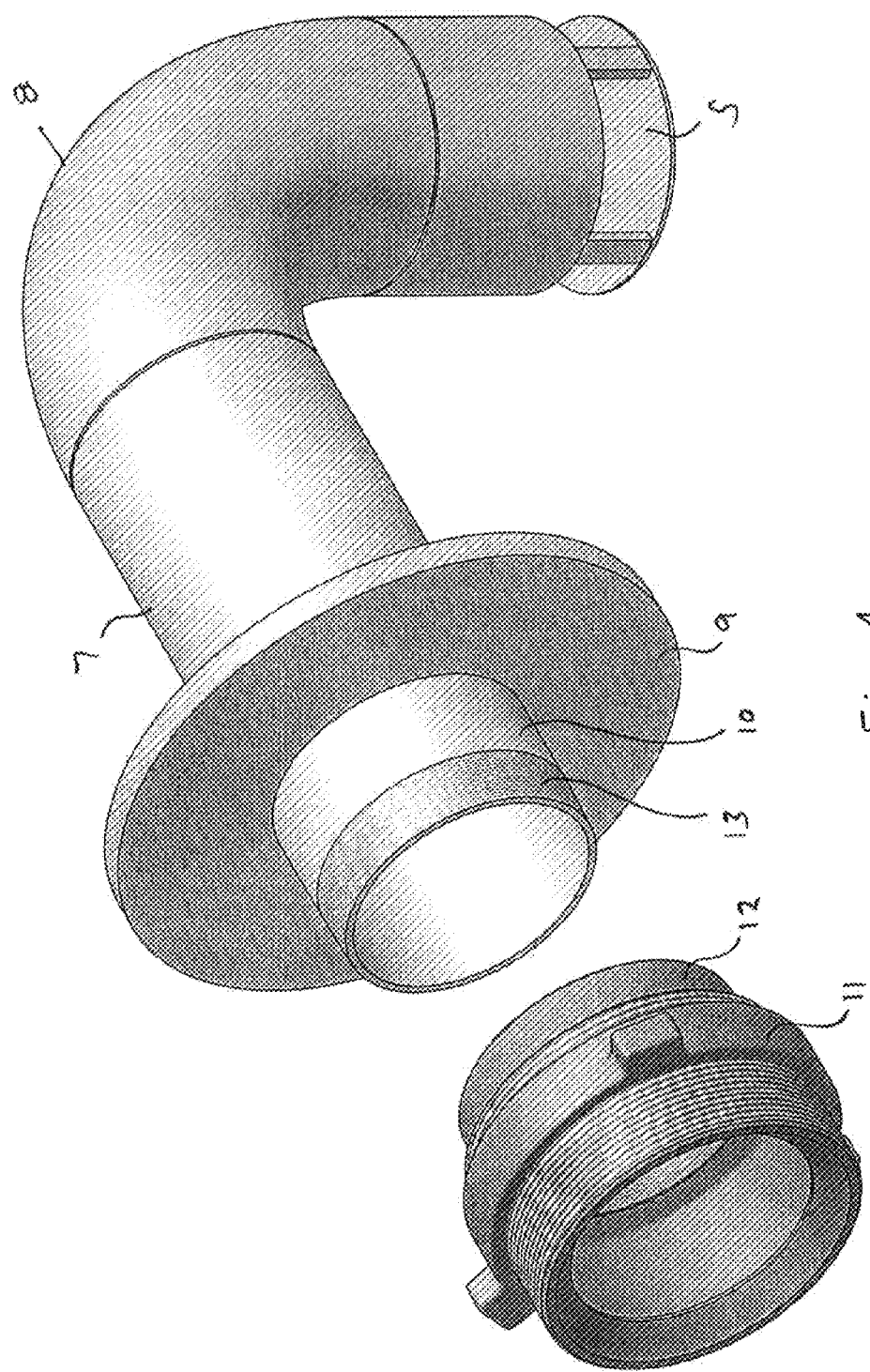
FIG. 4 is a partially exploded view of an embodiment of the drain assembly.

FIGS. 2 through 4 show an embodiment of a drain assembly 4 in accordance with the present invention. In general, the drain assembly 4 is comprised of a drain intake 5 that is connected to and in fluid communication with a wall traversing portion 6. As shown, drain intake 5 is positioned, and deployable when in use, in close proximity to the bottom or floor 3 of the tank with the wall traversing portion 6 deployable through tank wall 2. The wall traversing portion 6 includes a conduit portion 7 that fluidly communicates between the drain intake 5 and a location exterior to the tank walls. Typically, conduit portion 7 would be in the form of a heavy walled pipe that includes a 90 degree elbow 8, permitting the conduit portion to be received approximately perpendicularly to the tank wall with the drain intake positioned in close proximity, and with its opening approximately parallel to, the bottom or floor of the tank.

In accordance with an aspect of the invention, conduit portion 7 includes an interior stopper plate 9 and a threaded portion 10. The drain assembly further includes a hammer nut 11 having interior threads such that the hammer nut may be threadably receivable over threaded portion 10. Preferably, threaded portion 10 of conduit portion 7 is located at the end of the conduit, opposite to elbow 8 and at a point where the end of the conduit exits the tank's wall into the exterior environment. In one embodiment of the invention threaded portion 10 comprises a sleeve 12 that is itself internally threaded and received upon threads 13 of the end of conduit portion 7. In that instance the exterior of sleeve 12 will be threaded to match the interior threads of hammer nut 11, permitting the hammer nut to be threadably received about the exterior of the sleeve.

With reference to FIG. 2, stopper plate 9 is fixed to conduit portion 7 at a location that allows the outer end of the conduit portion to extend through the tank's wall when the stopper plate comes into contact with, or is in close proximity to, the interior surface of the wall. It is expected that in most instances the stopper plate will be continuous about the perimeter of the conduit and rigidly fixed thereto. It will thus be appreciated that with the outer end of conduit portion 7 extending through a hole or opening in the tank wall, hammer nut 11 can be threadably received over with the end of the conduit portion (or the end of sleeve 12 where sleeve 12 is utilized) such that tightening the hammer nut causes the nut to engage the exterior wall of the tank, thereby causing stopper plate 9 to compress the tank liner 14 against the interior surface of the wall. As the hammer nut is further tightened the drain assembly will be rigidly secured to the tank's wall and the compressive force applied by the stopper plate compressing the liner against the tank wall will help to prevent the unintentional leakage of the contents of the tank. To further prevent leakage, a gasket 15 may be positioned between the stopper plate and the tank liner.

In an embodiment of the invention, the drain assembly may further include an interior plate 16, an exterior plate 17, and a spacer 18. Each of interior plate 16, exterior plate 17 and spacer 18 are receivable about conduit portion 7 with the spacer positioned between the interior and exterior plates such that the interior plate bears against one end of the spacer and the exterior plate bears against a second or opposite end of the spacer. In some applications it may be desirable to weld or otherwise secure the interior and exterior plates to the opposite ends of the spacer.

Setting-off the distance between interior plate 16 and exterior plate 17 (i.e. determining the size of spacer 18) will enable the two spacer plates to be positioned about conduit portion 7 such that they lie generally co-planar with the interior and exterior surfaces of the tank's wall. In this manner when the hammer nut is tightened upon the threaded portion of the conduit, or upon sleeve 12 (where sleeve 12 is utilized) the hammer nut will largely engage exterior plate 17. The force of the hammer nut will thus cause the exterior plate to engage the spacer, cause the spacer to engage the interior plate, and cause the stopper plate to compress the tank liner between the stopper plate and the interior plate. In this manner, the force supplied by the hammer nut compressing the stopper plate against the liner will be borne by interior plate 16, exterior plate 17 and spacer 18, thereby minimizing the compressive force applied to the tank wall. With the hammer nut engaging exterior plate 17, the frictional force that would otherwise occur between the nut and the tank wall as the nut is rotated will be borne by plate 17. The use of interior and exterior plates 16 and 17 (which will generally be circular in nature) also helps to distribute torsional or twisting loading of the drain assembly across a greater portion of wall 2.

The drain assembly may include a drain pan 19 recessed within the bottom of the tank immediately adjacent to drain intake 5. Further, the drain intake may have incorporated into it a screen, grate or other similar apparatus to avoid drawing large size objects or debris into the drain assembly.

It will be appreciated that the above described structure provides a fast and simplified method to securely retain a drain assembly within the wall of a tank or containment vessel, of the type that utilizes a flexible and removable interior liner. The structure permits the drain assembly to be held securely in place without the use of a series of bolts that must pass through the liner material, and thereby removes the difficulties that are often associated with traditional drains wherein the liner may be ripped or torn about the bolt holes should the liner shift during loading or unloading the tank. In addition, the unique plate, conduit and nut structure described permits the drain assembly to be secured to the wall quickly and efficiently. Where the drain assembly utilizes interior plate 16, exterior plate 17 and spacer 18, there is further presented the ability to accommodate the compressive and frictional force that would otherwise be exerted upon the walls of the tank, that could cause damage thereto.

It is to be understood that what has been described are the preferred embodiments of the invention. The scope of the claims should not be limited by the preferred embodiments set forth above, but should be given the broadest interpretation consistent with the description as a whole.

The invention claimed is:

1. A drain assembly for a tank or containment vessel of the type having a flexible and removable interior liner, the drain assembly comprising:

a drain intake in fluid communication with a wall traversing portion, said drain intake operatively deployable in proximity to the bottom of the tank and said wall traversing portion operatively deployable through a wall of the tank, said wall traversing portion including a conduit portion in fluid communication with said drain intake and with a location exterior to the tank, said conduit portion including an interior stopper plate and a threaded portion, said drain assembly including a hammer nut, said hammer nut threadably receivable over said threaded portion when said conduit portion is received through the wall of the tank wherein tightening said hammer nut upon said threaded portion causes said hammer nut to engage the exterior of the tank wall causing said stopper plate to compress the tank liner against the interior surface of the tank wall thereby securing said drain assembly to the tank wall and helping to prevent the unintentional leakage of the contents of the tank through the tank wall; and an interior plate, an exterior plate and a spacer, each of said interior and exterior plates and said spacer receivable about said conduit portion with said spacer positioned between said interior and exterior plates and said interior plate bearing against a first end of said spacer and said exterior plate bearing against a second end of said spacer, said interior and exterior plates positioned such that when said hammer nut is tightened upon said threaded portion said hammer nut engages said exterior plate, which engages said spacer, which engages said interior plate, causing said stopper plate to compress the tank liner between the stopper plate and the interior plate.

2. The drain assembly as claimed in claim 1 including a gasket positioned between said stopper plate and the tank liner, wherein tightening said hammer nut upon said threaded portion causes said stopper plate to compress said gasket against the tank liner.

3. The drain assembly as claimed in claim 1 wherein said stopper plate is continuous about the perimeter of said conduit portion and rigidly fixed thereto.

4. The drain assembly as claimed in claim 3 wherein said conduit portion includes a 90 degree elbow permitting said conduit portion to be received approximately perpendicularly through the tank wall and said drain intake to be positioned in close proximity, and with its opening approximately parallel, to the bottom of the tank.

5. The drain assembly as claimed in claim 4 wherein said threaded portion comprises a sleeve that is threadably received upon said conduit portion, said sleeve including exterior threads that permit the receipt of said hammer nut thereon.

6. The drain assembly as claimed in claim 1 wherein said drain intake includes a drain pan recessed within the bottom of the tank.

7. A drain assembly for a tank or containment vessel of the type having a flexible and removable interior liner, the drain assembly comprising:

a drain intake in fluid communication with a wall traversing portion, said drain intake operatively deployable in proximity to the bottom of the tank and said wall traversing portion operatively deployable through a wall of the tank, said wall traversing portion including a conduit portion in fluid communication with said drain intake and with a location exterior to the tank, said conduit portion including a stopper plate and a threaded portion, said drain assembly including a hammer nut, said hammer nut threadably receivable over said threaded portion when said conduit portion is received through the wall of the tank wherein tightening said hammer nut upon said threaded portion causes said hammer nut to engage the exterior of the tank wall causing said stopper plate to compress the tank liner against the interior surface of the tank wall thereby securing said drain assembly to the tank wall and helping to prevent the unintentional leakage of the contents of the tank through the tank wall, wherein said stopper plate is continuous about the perimeter of said conduit portion and rigidly fixed thereto, and wherein said conduit portion includes a 90 degree elbow permitting said conduit portion to be received approximately perpendicularly through the tank wall and said drain intake to be positioned in close proximity, and with its opening approximately parallel, to the bottom of the tank, and wherein said threaded portion comprises a sleeve that is threadably received upon said conduit portion, said sleeve including exterior threads that permit the receipt of said hammer nut thereon; and an interior plate, an exterior plate and a spacer, each of said interior and exterior plates and said spacer receivable about said conduit portion with said spacer positioned between said interior and exterior plates and said interior plate bearing against a first end of said spacer and said exterior plate bearing against a second end of said spacer, said interior and exterior plates positioned such that when said hammer nut is tightened upon said threaded portion said hammer nut engages said exterior plate, which engages said spacer, which engages said interior plate, causing said stopper plate to compress the tank liner between the stopper plate and the interior plate.

8. The drain assembly as claimed in claim 7 including a gasket positioned between said stopper plate and the tank liner, wherein tightening said hammer nut upon said threaded portion causes said stopper plate to compress said gasket against the tank liner.

9. The drain assembly as claimed in claim 7 wherein said drain intake includes a drain pan recessed within the bottom of the tank.

* * * * *